United States Patent
Takahashi et al.

(10) Patent No.: US 6,897,250 B1
(45) Date of Patent: May 24, 2005

(54) AUTOMOBILE INTERIOR OR EXTERIOR TRIM MATERIAL

(75) Inventors: Masayuki Takahashi, deceased, late of Urawa (JP); by Yuko Takahashi, legal representative, Urawa (JP); Toshinori Yukino, Urawa (JP); Mitsuru Fukushima, Urawa (JP)

(73) Assignee: Asahi Denka Kogyo K. K., Tokyo (JP)

( * ) Notice: Subject to any disclaimer, the term of this patent is extended or adjusted under 35 U.S.C. 154(b) by 368 days.

(21) Appl. No.: 09/702,828

(22) Filed: Nov. 1, 2000

(Under 37 CFR 1.47)

Related U.S. Application Data

(63) Continuation-in-part of application No. 09/298,902, filed on Apr. 26, 1999, now abandoned.

(51) Int. Cl.$^7$ ................................................. C08K 5/34
(52) U.S. Cl. .................... 524/99; 524/102; 524/103; 524/128; 524/291
(58) Field of Search ......................... 524/99, 102, 103, 524/128, 291

(56) References Cited

U.S. PATENT DOCUMENTS

| | | |
|---|---|---|
| 3,839,277 A | 10/1974 | Spivack et al. |
| 4,371,647 A | 2/1983 | Minagawa et al. |

FOREIGN PATENT DOCUMENTS

| | | |
|---|---|---|
| EP | 56062835 | 5/1981 |
| EP | 0 449 685 A1 | 10/1991 |

OTHER PUBLICATIONS

Abstract of German Offen 2,828,363, English version corresponding to Chemical Abstracts (CA) No. 90: 153057g (Feb. 8, 1979).

Abstract of Japanese Patent Application Laid-open No. 56-62835, English version corresponding to CA No. 95: 170369f (May 29, 1981).

Abstract of Japanese Patent Application Laid-open No. 58-84839, English version corresponding to CA No. 99: 123611b (May 21, 1983).

Abstract of Japanese Patent Application Laid-open No. 7-188473, English (Jul. 25, 1995).

Abstract of Japanese Patent Application Laid-open No. 7-179719, English (Jul. 18, 1995).

*Primary Examiner*—Kriellion A. Sanders
(74) *Attorney, Agent, or Firm*—Nixon & Vanderhye P.C.

(57) ABSTRACT

An automobile interior or exterior trim material which is formed of a thermoplastic elastomer composition containing 100 parts by weight of a thermoplastic elastomer and 0.001–10 parts by weight of an alkyl benzoate compound of the following formula (I):

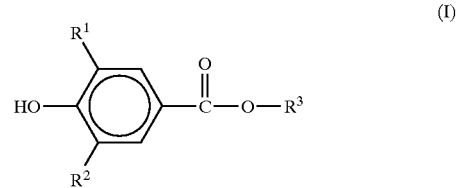

wherein each of $R^1$ and $R^2$ is a hydrogen atom, a C1–C8 alkyl or cycloalky; grout, or a C6–C12 aryl, alkylaryl, or arylalkyl group; and $R^3$ is a C1–C30 alkyl group. The interior or exterior trim material of the invention has improved weather resistance and resistance to weather-induced coloring.

12 Claims, No Drawings

AUTOMOBILE INTERIOR OR EXTERIOR TRIM MATERIAL

CROSS-REFERENCE TO RELATED APPLICATION

This application is a continuation-in-part (CIP) of copending U.S. patent application Ser. No. 09/298,902 filed on Apr. 26, 1999, now abandoned, the entire content of which is expressly incorporated hereinto by reference.

BACKGROUND OF THE INVENTION

1. Field of the Invention

The present invention relates to material suitable for the interior or exterior trim of an automobile (hereinafter simply called an "interior or exterior trim material") which comprises a thermoplastic elastomer having improved weather resistance due to incorporation of a specific UV absorber; i.e., alkyl benzoate having a specified chemical structure. More particularly, the present invention relates to an interior or exterior trim material having improved weather resistance and resistance to weather-induced coloring.

2. Background Art

Conventionally, vinyl chloride resins have been widely used as interior or exterior trim materials. However, use of vinyl chloride resins has recently been restricted because of concerns in relation to environmental pollution, calling for substitution by non-halogen resins.

One possible substitute may be realized by use of a thermoplastic elastomer having resin properties suitable for an interior or exterior trim material. An interior or exterior trim material is required to have high weather resistance and resistance to weather-induced coloring, because the material is exposed to strong sunshine at high temperature while, for example, the automobile is parked outdoors.

Conventionally, a variety of UV absorbers and photostabilizers have been disclosed, and use method of these compounds has been suggested for imparting weather resistance to polyolefin resins used as polymer materials for general molding. Examples of UV absorbers include benzotriazole UV absorbers, benzophenone UV absorbers, phenoltriazine UV absorbers, and alkyl or aryl benzoate UV absorbers; and examples of photostabilizers include hindered amine photostabilizers.

For example, Japanese Patent Application Laid-Open (kokai) No. 54-21450 discloses a method for improving weather resistance of polyolefin resins by combined use of 3,5-di-tert-butyl-4-hydroxybenzoic acid hexadecyl ester (which is an alkyl benzoate UV absorber), and a benzotriazole UV absorber or a benzophenone UV absorber. Japanese Patent Application Laid-Open (kokai) No. 55-54339 discloses a method for improving weather resistance of polypropylene resins by combined use of the above-mentioned 3,5-di-tert-butyl-4-hydroxybenzoic acid hexadecyl ester and pentaerythritol dialkyldiphosphite. Japanese Patent Application Laid-Open (kokai) No. 56-62835 discloses a method for improving weather resistance of polyolefin by combined use of the above-mentioned 3,5-di-tert-butyl-4-hydroxybenzoic acid hexadecyl ester and a hindered amine photostabilizer.

Regarding the above-mentioned 3,5-di-tert-butyl-4-hydroxybenzoic acid hexadecyl ester, which is an alkyl benzoate UV absorber, Japanese Patent Application Laid-Open (kokai) No. 58-84839 discloses use thereof for pipes made of poly-1-butene; Japanese Patent Application Laid-Open (kokai) No. 1-62360 discloses use of the same for polypropylene resins which are subjected to radiation sterilization and used in the field of medicine, and Japanese Patent Application Laid-Open (kokai) No. 7-188473 discloses use of the same as materials in the agricultural field.

Japanese Patent Application Laid-Open (kokai) No. 7-179719 discloses use of 3,5-di-tert-butyl-4-hydroxybenzoic acid 2,4-di-tert-butylphenyl ester (which is an aryl benzoate UV absorber) as an automobile material.

Thus, a variety of methods have been disclosed for improving weather resistance of polymer materials for general molding. However, no known UV absorbers or photostabilizers provide satisfactory effects. Thermoplastic elastomers which are to be used as substitutes for interior or exterior trim materials are no exception; they also involve the same problems. However, no method for improving properties of thermoplastic elastomers has been known. An object of the present invention is to solve the above problems inherent to thermoplastic elastomers.

SUMMARY OF THE INVENTION

In view of the foregoing, the present inventors have conducted careful studies and have found that, when a 3,5-dialkyl-4-hydroxybenzoic acid alkyl ester is added to a thermoplastic elastomer, there can be obtained an interior or exterior trim material which has excellent weather resistance, and resistance to weather-induced coloring, without causing bleeding or fogging, or contamination, such as plate-out, of processing apparatuses. The 3,5-dialkyl-4-hydroxybenzoic acid alkyl ester is an UV absorber of alkyl benzoate among other benzoate compounds.

Accordingly, in a first aspect of the present invention, there is provided an interior or exterior trim material which comprises a thermoplastic elastomer composition containing 100 parts by weight of a thermoplastic elastomer and 0.001–10 parts by weight of an alkyl benzoate compound represented by the following formula (I):

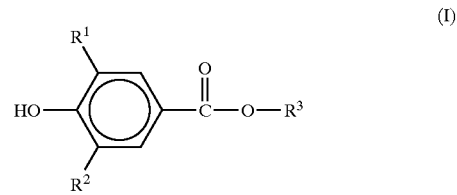

wherein each of $R^1$ and $R^2$ is a hydrogen atom, a C1–C8 alkyl or cycloalkyl group, or a C6–C12 aryl, alkylaryl, or arylalkyl group; and $R^3$ is a C1–C30 alkyl group.

Preferably, each of $R^1$ and $R^2$ in the alkyl benzoate compound represented by formula (I) is a C1–C8 alkyl group.

Preferably, each of $R^1$ and $R^2$ in the alkyl benzoate compound represented by formula (I) is a tertiary butyl group or a tertiary amyl group.

Preferably, $R^3$ in the alkyl benzoate compound represented by formula (I) is a C6–C8 alkyl group.

Preferably, the thermoplastic elastomer is a polyolefin thermoplastic elastomer.

Preferably, the interior or exterior trim material further contains a hindered amine photostabilizer.

Preferably, the hindered amine photostabilizer has a 1,2,2,6,6-pentamethyl-4-piperidyl group.

Preferably, the interior or exterior trim material further contains a phosphorus-containing antioxidant of the following formula in an amount of 0.001–10 parts by weight.

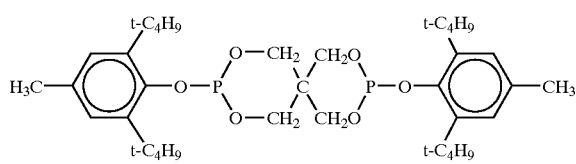

Preferably, the interior or exterior trim material further contains a pigment.

Preferably, the interior or exterior trim material is used as a facing material for a ceiling, seat, or dashboard.

DETAILED DESCRIPTION OF THE PREFERRED EMBODIMENTS

Thermoplastic Elastomers

Examples of thermoplastic elastomers used in the present invention include polyolefin thermoplastic elastomers and block copolymer-type polystyrene thermoplastic elastomers. The polyolefin thermoplastic elastomer comprises polyolefin resins such as polypropylene and polyethylene serving as hard segments and rubber compositions such as EPDM serving as soft segments. The block copolymer-type polystyrene thermoplastic elastomer comprises polystyrene serving as hard segments and polydienes such as polybutadiene or polyisoprene serving as soft segments. Alternatively, a blend of the polyolefin elastomers and the polystyrene elastomers may also be used as the thermoplastic elastomer of the present invention.

The methods for combining soft segments and hard segments in thermoplastic elastomers may be roughly divided into simple blending, implantation by copolymerization, and dynamic cross-linking.

Combinations of segments of polystyrene thermoplastic elastomers include a styrene-butadiene-styrene block copolymer (SBS), a styrene-isoprene-styrene block copolymer (SIS), a styrene-ethylene-butylene-styrene block copolymer (SEBS), a styrene-ethylene-propylene-styrene block copolymer (SEPS), a hydrogenated polymer of any one of the four copolymers, a hydrogenated polymer of random SBR (HSBR), and a blend of polypropylene and one or more arbitrary members selected from among these polymers.

Alkyl Benzoate Compounds Represented by Formula (I)

Examples of alkyl groups represented by $R^1$ and $R^2$ in the above formula (I) include alkyl groups such as methyl, ethyl, propyl, isopropyl, butyl, isobutyl, sec-butyl, tert-butyl, pentyl, tert-pentyl, hexyl, heptyl, octyl, and tert-octyl; cycloalkyl groups such as cyclopentyl and cyclohexyl; aryl groups such as phenyl and naphthyl; alkylaryl groups such as methylphenyl and butylphenyl; and arylalkyl groups such as phenylmethyl, 1-phenylethyl, and cumyl.

Examples of alkyl groups represented by $R^3$ include methyl, ethyl, propyl, isopropyl, butyl, isobutyl, secondary-butyl, tertiary-butyl, pentyl, tertiary-pentyl, hexyl, heptyl, octyl, tertiary-octyl, 2-ethylhexyl, nonyl, decyl, undecyl, dodecyl, tridecyl, tetradecyl, pentadecyl, hexadecyl, heptadecyl, octadecyl, behenyl, and triacontyl.

More specifically, examples of the alkyl benzoate compounds represented by formula (I) include the following compounds (Nos. 1–5). However, the present invention is in no way limited by the following illustrations.

Compound No. 1:

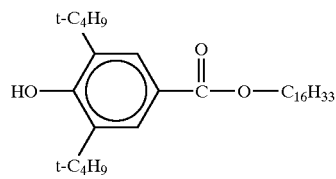

Compound No. 2:

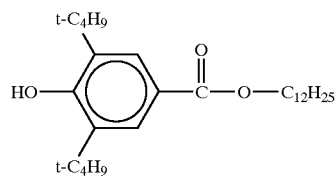

Compound No. 3:

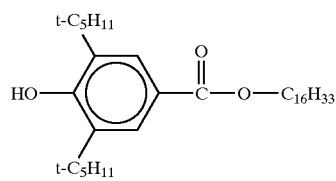

Compound No. 4:

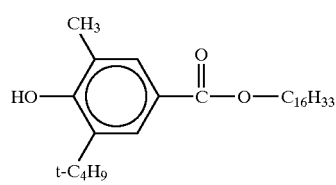

Compound No. 5:

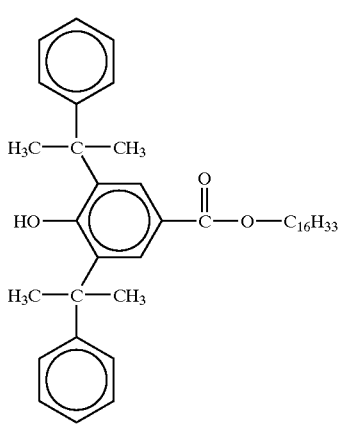

The thermoplastic elastomer composition of the present invention comprises the aforementioned thermoplastic elastomer (100 parts by weight) and the aforementioned alkyl benzoate compound (0.001–10 parts by weight). When the amount of the alkyl benzoate compound is less than 0.001 parts by weight, sufficient weather resistance required for an interior or exterior trim material cannot be obtained. In contrast, an amount thereof in excess of 10 parts by weight is not preferable, because the compound may bleed from the interior or exterior trim material because of a change in the environment, such as a rise in temperature.

The thermoplastic elastomer composition of the present invention is appropriately used as interior or exterior trim materials; for example, for materials of ceilings, doors, seats, trunks, wipers and bumper, which are formed by use of known methods such as extrusion molding, injection molding, compression molding, or lamination. The thermoplastic elastomers are preferably used as interior trim materials for ceilings, seats, and dashboards.

Hindered amine photo-stabilizers may optionally be added into the thermoplastic elastomer composition of the present invention. The addition of the hindered amine photo-stabilizers advantageously amplifies the effect of aforementioned alkyl benzoate compounds used in the present invention; specifically, enhancement in weather resistance.

In addition, additives such as widely-used antioxidants may be used in combination with the above composition, and examples of the antioxidants include a phosphite compound, a phenol compound, and a sulfur compound.

Ultraviolet absorbers other than the alkyl benzoate compounds of the present invention may be used in combination with the above-described composition.

Examples of the above-described hindered amine photo-stabilizers include 2,2,6,6-tetramethyl-4-piperidyl benzoate, N-(2,2,6,6-tetramethyl-4-piperidyl)dodecylsuccinic imide, 1-[(3,5-di-tert-butyl-4-hydroxyphenyl)propionyloxyethyl]-2,2,6,6-tetramethyl-4-piperidyl(3,5-di-tert-butyl-4-hydroxyphenyl)propionate, bis(2,2,6,6-tetramethyl-4-piperidyl)sebacate, bis(1,2,2,6,6-pentamethyl-4-piperidyl) sebacate, bis(1,2,2,6,6-pentamethyl-4-piperidyl)-2-butyl-2-(3,5-di-tert-butyl-4-hydroxybenzyl)malonate, N,N'-bis(2,2,6,6-tetramethyl-4-piperidyl)hexamethylenediamine, tetra(2,2,6,6-tetramethyl-4-piperidyl)butanetetracarboxylate, bis(2,2,6,6-tetramethyl-4-piperidyl) di(tridecyl) butanetetracarboxylate, bis(1,2,2,6,6-pentamethyl-4-piperidyl) di(tridecyl)butanetetracarboxylate, 3,9-bis[1,1-dimethyl-2-{tris(2,2,6,6-tetramethyl-4-piperidyloxycarbonyloxy)butylcarbonyloxy}-ethyl]-2,4,8,10-tetraoxaspiro[5.5]undecane, 3,9-bis[1,1-dimethyl-2-{tris (1,2,2,6,6-pentamethyl-4-piperidyloxycarbonyloxy) butylcarbonyloxy}ethyl]-2,4,8,10-tetraoxaspiro[5.5] undecane, 1,5,8,12-tetrakis[4,6-bis{N-(2,2,6,6-tetramethyl-4-piperidyl)butylamino}-1,3,5-triazin-2-yl]-1,5,8,12-tetrazadodecane, a 1-(2-hydroxyethyl)-2,2,6,6-tetramethyl-4-piperidinol/dimethyl succinate condensation product, a 2-tert-octylamino-4,6-dichlcro-s-triazine/N,N'-bis(2,2,6,6-tetramethyl-4-piperidyl)hexamethylenediamine condensation product, an N,N'-bis(2,2,6,6-tetramethyl-4-piperidyl) hexamethylenediamine/dibromoethane condensation product, 2,2,6,6-tetramethyl-4-hydroxypiperidin-N-oxy, bis (2,2,6,6-tetramethyl-N-oxylpiperidine)sebacate, tetrakis(2,2,6,6-tetramethyl-N-oxylpiperidyl)butane-1,2,3,4-tetracarboxylate, tetrakis(1,2,2,6,6-pentamethyl-4-piperidyl) 1,2,3,4-butanetetracarboxylate, and 3,9-bis(1,1-dimethyl-2-(tris (2,2,6,6-tetramethyl-N-oxylpiperidyl-4-oxycarbonyl)butylcarbonyloxy)ethyl)-2,4,8,10-tetraoxaspiro[5.5]undecane, especially carboxylic acid esters of 1,2,2,6,6-pentamethyl-4-piperidinol or 2,2,6,6-tetramethyl-4-piperidinol.

The hindered amine photostabilizer is most preferably present in an amount between about 0.10 to about 0.50 part by weight, for example, between about 0.15 to about 0.30 part by weight, based on 100 parts by weight of the thermoplastic elastomer.

Examples of the phosphite antioxidants includes tris (nonylphenyl)phosphite, tris(2,4-di-tert-butylphenyl) phosphite, tris[2-tert-butyl-4-(3-tert-butyl-4-hydroxy-5-methylphenylthio)-5-methylphenyl]phosphite, tridecyl phosphite, octyldiphenyl phosphite, di(decyl)monophenyl phosphite, di(tridecyl)pentaerythritol diphosphite, distearyl-pentaerythritol diphosphite, di(nonylphenyl)pentaerythritol diphosphite, bis(2,4-di-tert-butylphenyl)pentaerythritol diphosphite, bis(2,6-di-tert-butyl-4-methylphenyl) pentaerythritol diphosphite, bis(2,4,6-tri-tert-butylphenyl) pentaerythritol diphosphite, bis(2,4-dicumylphenyl) pentaerythritol diphosphite, tetra(tridecyl) isopropylidenediphenol diphosphite, tetra(tridecyl)-4,4'-n-butylidenebis(2-tert-butyl-5-methylphenol)diphosphite, hexa(tridecyl)-1,1,3-tris(2-methyl-4-hydroxy-5-tert-butylphenyl)butane triphosphite, 2,2'-methylenebis(4,6-di-tert-butylphenyl)-2-ethylhexyl phosphite, 2,2'-methylenebis (4,6-di-tert-butylphenyl)octadecyl phosphite, 2,2'-ethylidenebis(4,6-di-tert-butylphenyl)fluorophosphite, tetrakis(2,4-di-tert-butylphenyl)biphenylene diphosphonite, 9,10-dihydro-9-oxa-10-phosphaphenanthrene-10-oxide, tris (2-[(2,4,8,10-tetrakis(tert-butyl)dibenzo[d,f][1,3,2] dioxaphosphebine-6-yl)oxy]ethyl)amine, and a phosphorous acid ester of 2-ethyl-2-butylpropylene glycol and 2,4,6-tri-tert-butyl phenol. Of these, bis(2,6-di-tert-butyl-4-methylphenyl)pentaerythritol diphosphite represented by the following formula is preferable in that it provides particularly excellent stabilizing effect.

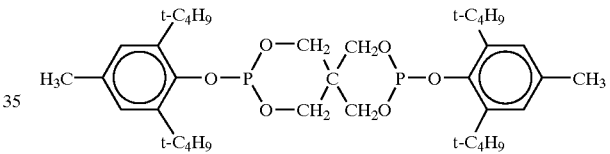

Examples of the phenol antioxidants include 2,6-di-tert-butyl-p-cresol, 2,6-diphenyl-4-octadecyloxyphenol, stearyl (3,5-di-tert-butyl-4-hydroxyphenyl)propionate, distearyl(3,5-di-tert-butyl-4-hydroxybenzyl)phosphonate, thiodiethylene glycol bis[(3,5-di-tert-butyl-4-hydroxyphenyl)propionate], 1,6-hexamethylenebis[(3,5-di-tert-butyl-4-hydroxyphenyl)propionate], 1,6-hexamethylenebis[(3,5-di-tert-butyl-4-hydroxyphenyl) propionic acid amide], 4,4'-thiobis(6-tert-butyl-m-cresol), 2,2'-methylenebis(4-methyl-6-tert-butylphenol), 2,2'-methylenebis(4-ethyl-6-tert-butylphenol), a bis[3,3-bis(4-hydroxy-3-tert-butylphenyl)butyric acid]glycol ester, 4,4'-butylidenebis(6-tert-butyl-m-cresol), 2,2'-ethylidenebis(4,6-di-tert-butylphenol), 2,2'-ethylidenebis(4-sec-butyl-6-tert-butylphenol), 1,1,3-tris(2-methyl-4-hydroxy-5-tert-butylphenyl)butane, bis[2-tert-butyl-4-methyl-6-(2-hydroxy-3-tert-butyl-5-methylbenzyl)phenyl]terephthalate, 1,3,5-tris(2,6-dimethyl-3-hydroxy-4-tert-butylbenzyl) isocyanurate, 1,3,5-tris(3,5-di-tert-butyl-4-hydroxybenzyl) isocyanurate, 1,3,5-tris(3,5-di-tert-butyl-4-hydroxybenzyl)-2,4,6-trimethylbenzene, 1,3,5-tris[(3,5-di-tert-butyl-4-hydroxyphenyl)propionyloxyethyl] isocyanurate, tetrakis [methylene-3-(3',5'-di-tert-butyl-4'-hydroxyphenyl) propionate]methane, 2-tert-butyl-4-methyl-6-(2-acryloyloxy-3-tert-butyl-5-methylbenzyl)phenol, 3,9-bis[1,1-dimethyl-2-{(3-tert-butyl-4-hydroxy-5-methylphenyl) propionyloxy}ethyl]-2,4,8,10-tetraoxaspiro[5.5]undecane, and triethylene glycol bis[(3-tert-butyl-4-hydroxy-5-methylphenyl)propionate].

Examples of the sulfur-containing antioxidants include dialkyl thiodipropionates such as dilauryl thiodipropionate, dimyristyl thiodipropionate, and distearyl thiodipropionate; and β-alkylmercaptopropionic acid esters of polyol such as pentaerythritol tetra(β-dodecylmercaptopropionate).

Examples of the ultraviolet absorbers other than the alkylbenzoate compounds of the present invention include 2-hydroxybenzophenones such as 2,4-dihydroxybenzophenone, 2-hydroxy-4-methoxybenzophenone, 2-hydroxy-4-octoxybenzophenone, and 5,5'-methylenebis(2-hydroxy-4-methoxybenzophenone); 2-(2'-hydroxyphenyl)benzotriazols such as 2-(2'-hydroxy-5'methylphenyl)benzotriazol, 2-(2'-hydroxy-3',5'-di-tert-butylphenyl)benzotriazol, 2-(2'-hydroxy-3',5'-di-tert-butylphenyl)-5-chlorobenzotriazol, 2-(2'-hydroxy-3'-tert-butyl-5'-methylphenyl)-5-chlorobenzotriazol, 2-(2'-hydroxy-5'-tert-octylphenyl)benzotriazol, 2-(2'-hydroxy-3',5'-dicumylphenyl)benzotriazol, and 2,2'-methylenebis(4-tert-octyl-5-benzotriazolyl)phenol; benzoates such as phenyl salicylate, resorcinol monobenzoate, and 2,4-di-tert-butylphenyl 3',5'-di-tert-butyl-4'-hydroxybenzoate; substituted oxanilides such as 2-ethyl-2'-ethoxyoxanilide and 2-ethoxy-4'-dodecyloxanilide; and cyanoacrylates such as ethyl α-cyano-β,β-diphenylacrylate and methyl 2-cyano-3-methyl-3-(p-methoxyphenyl)acrylate.

The thermoplastic elastomer composition of the present invent on may also comprise heavy metal deactivators, nucleating agents, metallic soap, hydrotalcites, pigments, organic tin compounds, plasticizers, epoxy compounds, foaming agents, antistatic agents, flame retardants, lubricants, processing aids, and inorganic fillers, such as talc, silica, mica, calcium silicate, calcium carbonate, barium sulfate, zinc oxide, magnesium hydroxide or a mixture thereof. The inorganic filler is incorporated in an amount of not more than 30 parts by weight, based on 100 parts by weight of the thermoplastic elastomer.

Particularly, in the thermoplastic elastomer composition of the present invention, the color of the product is easily adjusted, and various known pigments can be used for the product, since plate-out of pigments from the composition into a processing machine does not occur.

Examples of pigments used in the thermoplastic elastomer composition of the present invention include inorganic pigments, azo pigments, nitro pigments, acine pigments, acidic dye lake pigments, vat dye pigments, isoindolinone pigments, basic dye lake pigments, mordant dye pigments, quinacridone pigments, phthalocyanine pigments, nitroso pigments, daylight fluorescent pigments, metal powder pigments, and polymer coupled pigments.

When the thermoplastic elastomers of the present invention are produced, the methods for addition of alkylbenzoate compounds and other additives thereto are not limited, and additives may be used in the following forms: powder, water dispersions such as emulsions or suspensions, and organic solutions.

Although the types of blenders are not limited, when powder additives are used, a ribbon mixer or a Henschel mixer is useful for dry blending, and a uniaxial or biaxial extruder is useful for kneading. A conventional vertical mixer is sufficient for blending when additives assume the forms of water dispersions or solutions.

Additionally, various processes for addition may be employed in accordance with the forms of additives. For example, powder additives can be added during molding of the thermoplastic elastomer compositions, and adsorption or impregnation of additives into a molded product may be performed by dipping a molded product into an additive solution after molding. As another method for addition during molding, the additives may be kneaded in a final blending process after preparation of a blended master batch of high concentration, or through granulation of powder additives to depress a dust.

The present invention will next be described in more detail by way of examples, which should not be construed as limiting the invention thereto.

EXAMPLE 1

Propylene resin (60 parts by weight), EPR (20 parts by weight), talc (20 parts by weight), titanium oxide (2 parts by weight), calcium stearate (0.05 parts by weight), stearyl (3,5-di-tert-butyl-4-hydroxyphenyl)propionate (0.1 parts by weight), tris(2,4-di-tert-butylphenyl)phosphite (0.05 parts by weight), tetrakis(1,2,2,6,6-pentamethyl-4-piperidyl) 1,2,3,4-butanetetracarboxylate (0.15 parts by weight) and an alkyl benzoate compound (Compound No. 1) (0.1 parts by weight) were blended in a ribbon mixer. The resultant mixture was supplied to a pelletizer and extruded at 250° C., to thereby prepare pellets.

Subsequently, after the above pellets were melted at 250° C., 2-mm thick sheets were prepared by injection molding, so as to serve as an interior or exterior trim material. The sheets were tested for weather resistance (time until occurrence of cracking) and weather coloring (yellowness index after 480 hours) by use of a sunshine weatherometer under the following conditions: black panel temperature: 83° C., 18-minute rain in a 120-minute cycle.

Ten test pieces (25 mm×50 mm×2 mm) of an interior or exterior trim material were placed in an 80° C. oven, and after elapse of one week their surfaces were visually observed for occurrence of bloom, as well as for severity of any bloom found. The results are evaluated as follows. O: no bloom, X: bloom on the entire surface.

A test tube containing 25 grams of a specimen was covered with a glass plate, and heated in a 100° C. oil bath for 48 hours, to thereby check for presence of deposited matter and the degree thereof (fogging) in the same manner as the bloom test. The results are evaluated as follows. O: no deposition over the glass plate, X: deposition over the entire glass surface. The results are shown in Table 1.

COMPARATIVE EXAMPLE 1

The same procedure as in Example 1 was performed, except that no alkyl benzoate compound was used (Comparative Example 1-1), an aryl benzoate compound serving as a UV absorber was used in place of the above compound (Comparative Example 1-2), or a UV absorbing compound other than a benzoate compound was used in place of the above compound (Comparative Example 1-3). The results are shown in Table 1.

TABLE 1

| | UV absorber | Time at which cracking occurred (hr) | Yellow-ness Index | Bloom | Fogging |
|---|---|---|---|---|---|
| Example 1 | Compound No. 1 | 2900 | 2.3 | O | O |
| Comp Ex. 1-1 | None | 1000 | 5.1 | O | O |

TABLE 1-continued

| | UV absorber | Time at which cracking occurred (hr) | Yellowness Index | Bloom | Fogging |
|---|---|---|---|---|---|
| Comp Ex. 1-2 | Comp. Compound 1*1 | 2100 | 12.2 | X | X |
| Comp Ex. 1-3 | Comp. Compound 2*2 | 1100 | 4.5 | X | X |

*1 3,5-di-tert-butyl-4-hydroxybenzoic acid-2,4-di-tert-butylphenyl ester
*2 2-(2'-hydroxy-5'-methylphenyl)-5-chlorobenzotriazole

EXAMPLE 2

The procedure of Example 1 was performed, except that propylene resin (65 parts by weight), EPDM (15 parts by weight), talc (20 parts by weight), titanium oxide (2 parts by weight), Phthalocyanine Blue (1 part by weight), hydrotalcite (0.1 parts by weight), tetrakis[methylene-3-(3',5'-di-tert-butyl-4'-hydroxyphenyl)propionate]methane (0.1 parts by weight), bis(2,6-di-tert-butyl-4-methylphenyl) pentaerythritol diphosphite (0.1 parts by weight), 3,9-bis[1,1-dimethyl-2-{tris(1,2,2,6,6-pentamethyl-4-piperidyloxycarbonyloxy)butylcarbonyloxy}ethyl]-2,4,8,10-tetraoxaspiro[5.5]undecane (0.2 parts by weight), and alkylbenzoate (Compound No. 1) (0.3 parts by weight) were blended, to thereby prepare pellets. By use of a kneading roller at 240° C., the pellets were molded into a sheet having a thickness of 0.1 mm.

A test piece of 25 mm×50 mm×0.1 mm was prepared from the obtained sheet, and the time at which cracking of the piece initiated was measured under the same conditions as in Example 1, by use of a sunshine weatherometer, to thereby evaluate the weather resistance thereof. Bloom and fogging of the piece were also evaluated in the same manner as in Example 1. The results of evaluation are shown in Table 2.

COMPARATIVE EXAMPLE 2

The procedure of Example 2 was performed, except that no alkylbenzoate was used (Comparative Example 2-1), arylbenzoate was used as an ultraviolet absorber (Comparative Example 2-2), or a compound other than a benzoate compound was used as an ultraviolet absorber (Comparative Example 2-3). The results are shown in Table 2.

TABLE 2

| | UV absorbers | Time at which cracking occurred (hr) | Bloom | Fogging |
|---|---|---|---|---|
| Example 2 | Compound No. 1 | 2700 | O | O |
| Comp. Ex. | | | | |
| 2-1 | None | 800 | O | O |
| 2-2 | Comp. Compound 1*1 | 1000 | X | X |
| 2-3 | Comp. Compound 2*2 | 1800 | X | X |

*1 and *2 correspond to the compounds of the same number shown in Table 1.

EXAMPLE 3

The procedure of Example 2 was performed, except that propylene-ethylene copolymer (70 parts by weight), SBS (30 parts by weight), Phthalocyanine Blue (1 part by weight), calcium stearate (0.2 parts by weight), tetrakis[methylene-3-(3',5'-di-tert-butyl-4'-hydroxyphenyl) propionate]methane (0.2 parts by weight), bis(2,6-di-tert-butyl-4-methylphenyl)pentaerythritol diphosphite (0.2 parts by weight), bis(2,2,6,6-tetramethyl-4-piperidyl)sebacate (0.3 parts by weight), and alkylbenzoate compound (Compound No. 1) (0.3 parts by weight) were blended, to thereby prepare pellets. By use of a kneading roller at 240° C., the pellets were molded into a sheet having a thickness of 0.1 mm.

A test piece was prepared from the sheet in the same manner as in Example 2, and weather resistance and resistance to weather-induced coloring thereof were evaluated by use of a sunshine weatherometer in the same manner as in Example 1 except that rainfall cycling was omitted. Weather resistance was evaluated in terms of degradation time, and resistance to weather-induced coloring was evaluated in terms of yellowness index after 2000 hours.

Transfer of pigments from the piece to the kneading roller resulting from the additives was considered to constitute plate-out. Specifically, after preparation of the aforementioned compounds, a sheet was prepared, by use of a kneading roller, from a vinyl chloride resin containing a white pigment. Blue-coloring of the sheet of vinyl chloride resin was evaluated by visual inspection as follows, X: obvious coloring, Δ: slight coloring, O: no coloring. The results are shown in Table 3.

COMPARATIVE EXAMPLE 3

The procedure of Example 3 was performed, except that arylbenzoate was used as an ultraviolet absorber in place of the alkylbenzoate compound (Comparative Example 3-1), or a compound other than a benzoate compound was used as an ultraviolet absorber (Comparative Example 3-2). The results are shown in Table 3.

TABLE 3

| | Test Compound | Time until embrittlement (hr) (weather resistance) | Plate-out | Yellowing (resistance to weather-induced coloring) |
|---|---|---|---|---|
| Example 3 | Compound No. 1 | 3300 | O | 4.6 |
| Comp. Ex. 3-1 | Comp. Compound 1*1 | 2300 | Δ | 15.6 |
| Comp. Ex. 3-2 | Comp. Compound 2*2 | 1500 | X | 10.8 |

*1 and *2 correspond to the compounds of the same number shown in Table 1.

EXAMPLE 4

Propylene resin (60 parts by weight), EPR (20 parts by weight), talc (20 parts by weight), titanium oxide (2 parts by weight), calcium stearate (0.05 parts by weight), tetrakis[methylene-3-(3',5'-di-tert-butyl-4'-hydroxyphenyl) propionate]methane (0.1 parts by weight), tetrakis(1,2,2,6,6-pentamethyl-4-piperidyl) 1,2,3,4-butanetetracarboxylate (0.15 parts by weight), alkylbenzoate compound (Compound No. 1) (0.2 parts by weight), and additives shown in Table 4 (0.1 parts by weight) were blended, and the resultant mixture was extruded at 250° C. to prepare pellets. Subsequently, a sheet having a thickness of 2 mm was prepared from the pellets through injection molding at 250° C., and the yellowness index thereof was measured. Weather resistance and resistance to weather-induced coloring were evaluated by use of a sunshine weatherometer in the same manner as in Example 1, except that rainfall cycling was omitted. Weather resistance was evaluated in terms of time until initiation of cracking, and resistance to weather-induced coloring was evaluated in terms of yellowness index. The results are shown in Table 4.

TABLE 4

|  | Additives | Time until initiation of cracking (hr) | Yellowness Index |
|---|---|---|---|
| Example 4-1 | none | 1400 | 10.2 |
| 4-2 | 2112*3 | 1400 | 6.2 |
| 4-3 | HP-10*4 | 1600 | 5.1 |
| 4-4 | PEP-36*5 | 2200 | 3.0 |

*3tris(2,4-di-tert-butylphenyl) phosphite
*42,2'-methylenebis(4,6-di-tert-butylphenyl)-2-ethylhexyl phosphite
*5bis(2,6-di-tert-butyl-4-methylphenyl)pentaerythritol diphosphite As clearly seen in the above mentioned detailed description, especially the results of Examples, when improving weather resistance of a thermoplastic elastomer resin, a thermoplastic elastomer containing the alkylbenzoate compound according to the present invention as an ultraviolet absorber exhibits remarkably improved weather resistance and resistance to weather-induced coloring as compared with the case where antioxidants, hindered amine photo-stabilizer, or other ultraviolet absorbers are used. Use of the alkylbenzoate compound yields other improvements, including prevention of blooming, prevention of fogging, prevention of plate-out during processing, and prevention of staining of a processing machine, because pigments which are used are not transferred.

What is claimed is:

1. An automobile interior or exterior trim material which comprises a thermoplastic elastomer composition containing 100 parts by weight of a propylene thermoplastic elastomer; 0.001–10 parts by weight of an alkyl benzoate compound represented by the following formula (I):

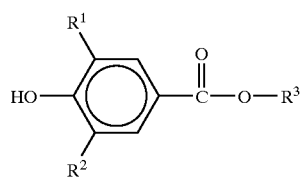

wherein each of $R^1$ and $R^2$ is a hydrogen atom, a C1–C8 alkyl or cycloalkyl group, or a C6–C12 aryl, alkylaryl, or arylalkyl group; and $R^3$ is a C1–C30 alkyl group; and 0.10 to 0.50 parts by weight of a hindered amine photostabilizer having a 1,2,2,6,6-pentamethyl-4-piperidyl group, based on 100 parts by weight of the polypropylene thermoplastic elastomer.

2. An automobile interior or exterior trim material according to claim 1, wherein each or $R^1$ and $R^2$ in the alkyl benzoate compound represented by formula (I) is a C1–C8 alkyl group.

3. An automobile interior or exterior trim material according to claim 1, wherein each of $R^1$ and $R^2$ in the alkyl benzoate compound represented by formula (I) is a tertiary butyl group or a tertiary amyl group.

4. An automobile interior or exterior trim material according to claim 1, wherein $R^1$ in the alkyl benzoate compound represented by formula (I) is a tertiary butyl group or a tertiary amyl group.

5. An automobile interior or exterior trim material according to claim 1, wherein the propylene thermoplastic elastomer comprises a blend of polypropylene and rubber compositions.

6. An automobile interior or exterior trim material according to claim 1, which further contains a phosphorus containing antioxidant of the following formula in an amount of 0.001–10 parts by weight:

7. An automobile interior or exterior trim material according to claim 1, which further contains a pigment.

8. An automobile interior or exterior trim material according to claim 1, which is used as a facing material for a ceiling, seat or dashboard.

9. An automobile interior or exterior trim material according to claim 1, 2 or 3, wherein $R^3$ is a C12–C16 alkyl group.

10. An automobile interior or exterior trim material according to claim 1, wherein the hindered amine photostabilizer is present in an amount between 0.15 to 0.30 part by weight, based on 100 parts by weight of the propylene thermoplastic elastomer.

11. An automobile interior or exterior trim material according to claim 1, wherein the hindered amine photostabilizer is a carboxylic acid ester of 1,2,2,6,6-pentamethyl-4-piperidinol.

12. An automobile interior or exterior trim material according to claim 1, wherein the hindered amine photostabilizer is selected from among tetrakis (1,2,2,6,6-pentamethyl-4-piperidyl) 1,2,3,4-butanetetracarboxylate, and 3,9-[1,1-dimethyl-2-{tris(1,2,2,6,6-pentamethyl-4-piperidyloxycarbonyloxy) butylcarbonyloxy}ethyl]-2,4,8,10-tetraoxaspiro[5.5] undecane.

* * * * *

UNITED STATES PATENT AND TRADEMARK OFFICE
CERTIFICATE OF CORRECTION

PATENT NO. : 6,897,250 B1
DATED : May 24, 2005
INVENTOR(S) : M. Takahashi et al.

It is certified that error appears in the above-identified patent and that said Letters Patent is hereby corrected as shown below:

<u>Title page,</u>
Item [30], Foreign Application Priorty Date, should read:
-- JP 10-132654      April 27, 1998 --

Signed and Sealed this

Twelfth Day of July, 2005

JON W. DUDAS
*Director of the United States Patent and Trademark Office*